Patented Oct. 22, 1929

1,732,478

UNITED STATES PATENT OFFICE

FRANK KURATH, OF MILWAUKEE, WISCONSIN, ASSIGNOR, BY MESNE ASSIGNMENTS, TO CUTLER-HAMMER INC., A CORPORATION OF DELAWARE

COLD-MOLDED PLASTIC-COMPOSITION ARTICLE AND METHOD OF MAKING THE SAME

No Drawing. Application filed August 7, 1925. Serial No. 48,886.

This invention relates to improvements in cold molded plastic composition articles, and more particularly to improvements in the finish or appearance thereof.

Cold molded plastic composition articles as heretofore produced have lacked the proper finish or polish to meet the requirements for many possible uses industrially and commercially, and the field of cold molded articles has been limited to a great extent for this reason. It has been proposed to improve the finish of such articles by subjecting the same to polishing or buffing operations, but it is ordinarily found that such treatment has an undesirable effect upon the mechanical properties of the molded articles. Moreover, the aforementioned treatment is relatively difficult and expensive, thus adding materially to the cost of the finished articles.

My invention has among its objects to provide a cold molded plastic composition article having an inherent luster or brilliant surface finish.

Another object is to produce articles of the afore-mentioned character in a simple and inexpensive manner.

Another object is to provide an improved mixture of materials adapted for cold molding.

Another object is to provide novel methods of treating ordinary cold molding plastic composition materials for accomplishment of the aforementioned desirable results.

Other objects and advantages of the invention will hereinafter appear.

As an example of one method of carrying out my invention, I may employ a well known molding plastic composition material comprising asbestos and a binder made from stearine pitch, coal tar pitch, gilsonite, fish oil and a suitable solvent. The aforementioned binder is made from the following ingredients in substantially the proportions enumerated:

| | Lbs. |
|---|---|
| Stearine pitch | 1050 |
| Coal tar pitch (melting point 130 degrees F.) | 945 |
| Gilsonite | 105 |
| Fish oil | 168 |

The stearine pitch, coal tar pitch and gilsonite are mixed together and melted at a temperature of 500 degrees F. The mixture is then cooled to about 475 degrees F. and the fish oil added. During the aforedescribed treatment of the materials a reaction takes place which causes precipitation of an amount of carbon corresponding to about twenty per cent of the weight of coal tar pitch employed. The carbon is allowed to settle and the melted binder is drawn off. To 130 pounds of this binder there is added about 32 pounds of benzol.

In my improved process the same binders and fillers are employed as in the old and well known processes. However, my invention contemplates the addition of a quantity of water to the ingredients during the mixing operation, which water largely remains in the mix during the pressing or molding operation, and is only removed during the process of curing the molded articles. As is well known, water in limited quantities has been added to such molding materials in pellet form just prior to pressing to improve the flow characteristics thereof by providing a film of lubricating medium on each pellet, and such use is here mentioned to avoid confusion with the distinctive use of water herein discussed.

In order to more clearly and fully disclose my invention, I will first describe a well known process of preparing and molding the aforementioned materials: The ingredients, consisting of about 40 pounds of the binder, 150 pounds of asbestos, 3 pounds of iron oxide, 9 pounds of sulphur, and 1 to 2 quarts of a solvent (such as benzol) are mixed cold in a suitable kneading machine; and when the asbestos is thoroughly impregnated the lumps of mixed material are disintegrated so that the same will pass through a ten-mesh screen. The screened material is then cold molded or pressed in the ordinary manner. The molded articles are then subjected to a suitable heat treatment for curing or indurating; such as five hours at 200 degrees F., five hours at 300 degrees F., five hours at 400 degrees F., and five hours at 450 degrees F.

In accordance with my invention, as aforeindicated, a quantity of water is added to the usual ingredients during the mixing operation. The water may be added to the asbestos and binder at the beginning of the mixing operation, or at any time during mixing, provided a thorough mixture of the water with the other ingredients or constituents is obtained; that is to say, after the addition of water, mixing should be continued for a sufficient period of time to cause the water to become an integral part of the mixture. While the aforedescribed procedure is suitable for most purposes, I prefer to make an emulsion of the water and binder and then mix the emulsion with the asbestos. I also prefer to effect the mixing operation under influence of heat, since this increases the fluidity of the binder, whereas a solvent such as benzol does not have to be added to accelerate the mixing as is the case with cold mixing. Thus, to 150 pounds of asbestos I add an emulsion comprising 40 pounds of the aforementioned binder, about 6 pounds of water, and 9 pounds of sulphur. These ingredients are mixed in a steam-jacketed kneading machine until impregnation of the asbestos with the emulsion is complete. The mixed material is then disintegrated and screened, and is then ready for cold molding in the usual manner, as aforedescribed.

The articles molded from this material are then subjected to the heat treatment or cure described in connection with the old process. Articles made from molding material prepared in accordance with my invention have a brilliant or glossy surface after curing, without further treatment of any kind.

As a modification of the improved process aforedescribed, I may secure an even better finish upon the molded and cured articles by working my improved molding material, after disintegration, in a so-called "pony" mixer. This machine produces grains or particles with shiny surfaces, the luster of which persists after the articles are pressed or molded and cured.

As an example of the applicability of my invention to other cold molding plastic composition materials, I will describe the following well known method of preparing a molding material, together with my improvement thereover:

A binder is made by melting 150 pounds of coal tar pitch (melting point 130 degrees F.), to which is added 20 pounds of coal tar oil. 60 pounds of this binder, 6 pounds of castor oil, 150 pounds of asbestos, and 1 to 2 quarts of solvent (such as benzol) are mixed together in a kneading machine without heating; and the mixed material is then disintegrated and screened as aforedescribed, whereupon it is ready for the usual cold molding operation. Articles molded from this material are cured by heating, say, for 6 hours at 200 degrees F., 6 hours at 300 degrees F., and 6 hours at 400 degrees F.

In accordance with my invention, an emulsion is made of 45 pounds of the last mentioned binder, 5 pounds of castor oil, and about 6 pounds of water. This emulsion is thoroughly mixed with 150 pounds of asbestos in a steam-jacketed kneading machine. The mixed material is then disintegrated and screened. Articles molded therefrom and cured in the manner last described are found to have the aforementioned superior finish or luster. The aforementioned modification comprising working of the disintegrated material in a "pony" mixer is also applicable to cold molding materials of this type, and is found to increase the luster of the cured articles.

It is to be noted that in accordance with my invention it is unnecessary to add a solvent during mixing of the binder and filler, thus tending to reduce the cost of the ingredients of the molding material; whereas the water employed acts not only as an emulsifying medium, but also provides for attainment of the aforedescribed improved finish or surface upon the molded and heat treated articles.

The foregoing detailed description has been given for clearness of understanding only, and no unnecessary limitation should be understood therefrom, but the appended claims should be construed as broadly as permissible in view of the prior art.

What I claim and desire to secure by Letters Patent is:

1. The method of improving the surface finish of articles formed of ordinary cold molding plastic composition material including a fibrous filler and an organic binder, which comprises intimately mixing with said material a quantity of water, cold molding the mixture under heavy pressure into articles of the desired form, and allowing said water to remain in the mixture during the molding operation.

2. The method of improving the surface finish of articles formed of ordinary cold molding plastic composition material including a fibrous filler and an organic binder, which comprises intimately mixing with said material a quantity of water, cold molding the mixture under heavy pressure into articles of the desired form, allowing said water to remain in the mixture during the molding operation, and thereafter removing the water as an incident of the usual prolonged heat induration treatment of the molded articles.

3. The method of improving the surface finish of cold molded plastic composition articles, which comprises emulsifying substantially 40 parts of an organic binder, 6 parts of water and 9 parts of sulphur, mixing said emulsion with 150 parts of asbestos under influence of heat and thereafter molding the mixture into articles of the desired shape.

4. The method of improving the surface finish of cold molded plastic composition articles, which comprises emulsifying substantially 40 parts of an organic binder, 6 parts of water and 9 parts of sulphur, mixing said emulsion with 150 parts of asbestos under influence of heat, thereafter molding the mixture into articles of the desired shape and then dehydrating and indurating the molded articles.

5. The method of improving the surface finish of cold molded plastic composition articles, which comprises emulsifying substantially 40 parts of an organic binder, 6 parts of water and 9 parts of sulphur, mixing said emulsion with 150 parts of asbestos under influence of heat, disintegrating the mixed material, then working the same to produce relatively small particles having shiny surfaces, and then molding the material.

6. A cold molding plastic composition comprising substantially 40 parts of an organic binder, 6 parts of water, and about 150 parts of asbestos.

7. A cold molding plastic composition comprising substantially 40 parts of an organic binder, 6 parts of water, and about 150 parts of asbestos, said ingredients having been intimately mixed under influence of heat to form a homogeneous mass.

8. A cold molding plastic composition comprising 40 parts of an organic binder, 6 parts of water, 9 parts of sulphur and 150 parts of asbestos, said ingredients having been thoroughly mixed under influence of heat, and then disintegrated and screened preparatory to molding thereof.

9. The method which comprises intimately mixing a quantity of fibrous material and an emulsion consisting of an organic binder and water, cold molding the mixture under pressure into articles of the desired shape, and then subjecting the molded articles to prolonged heat treatment for curing.

10. The method which comprises intimately mixing, under applied heat, a quantity of fibrous filler material and an emulsion consisting of an organic binder and water, cold molding the mixture under heavy pressure into articles of the desired shape and then subjecting the molded articles to prolonged heat induration treatment.

11. The method which comprises mixing an organic binder and water to form an emulsion, incorporating with the emulsion a relatively large quantity of fibrous filler material in the absence of an organic solvent, cold molding the resulting plastic composition material into articles of the desired shape and then heat treating the molded articles to dehydrate and harden the same.

In witness whereof, I have hereunto subscribed my name.

FRANK KURATH.